US011310959B2

(12) United States Patent
Geromiller

(10) Patent No.: US 11,310,959 B2
(45) Date of Patent: Apr. 26, 2022

(54) TOOL HEAD FOR A HAND-GUIDED IMPLEMENT AND IMPLEMENT HAVING A TOOL HEAD

(71) Applicant: Andreas Stihl AG & Co. KG, Waiblingen (DE)

(72) Inventor: Ludwig Geromiller, Welzheim (DE)

(73) Assignee: ANDREAS STIHL AG & CO. KG, Waiblingen (DE)

(*) Notice: Subject to any disclaimer, the term of this patent is extended or adjusted under 35 U.S.C. 154(b) by 398 days.

(21) Appl. No.: 16/441,206

(22) Filed: Jun. 14, 2019

(65) Prior Publication Data
US 2019/0387673 A1 Dec. 26, 2019

(30) Foreign Application Priority Data
Jun. 22, 2018 (EP) .................................. 18 179 212

(51) Int. Cl.
*A01D 34/40* (2006.01)
*A01D 34/56* (2006.01)
*A01D 34/90* (2006.01)
*A01D 34/404* (2006.01)

(52) U.S. Cl.
CPC ........... *A01D 34/404* (2013.01); *A01D 34/56* (2013.01); *A01D 34/905* (2013.01)

(58) Field of Classification Search
CPC ..... A01D 34/404; A01D 34/56; A01D 34/905
See application file for complete search history.

(56) References Cited

U.S. PATENT DOCUMENTS

| 2,242,369 | A | * | 5/1941 | Newton | ............... | A01D 34/404 56/246 |
| 2,574,947 | A | * | 11/1951 | Allen | ................... | A01D 34/404 56/246 |
| 3,631,658 | A | * | 1/1972 | Green | ................. | A01G 3/0535 56/11.3 |

(Continued)

FOREIGN PATENT DOCUMENTS

| DE | 69027795 T2 | 11/1996 |
| DE | 19918161 A1 | 11/2000 |

(Continued)

OTHER PUBLICATIONS

European Search Report, EP 18179212, dated Jan. 24, 2019.

*Primary Examiner* — Abigail A Risic
(74) *Attorney, Agent, or Firm* — Lucas & Mercanti, LLP; Klaus P. Stoffel

(57) ABSTRACT

A tool head for a hand-guided implement possesses two rotatably mounted tools, wherein a first tool is drivable via a first linkage and a second tool is drivable via a second linkage. The tools are drivable so that they rotate back and forth in opposite directions about a common rotational axis. The first linkage possesses a first drive member coupled to a first coupling member pivotably about a first link axis. The first coupling member is coupled to the first tool pivotably about a second link axis. The second linkage possesses a second drive member coupled to a second coupling member pivotably about a third link axis. The second coupling member is coupled to the second tool pivotably about a fourth link axis. The rotational axis of the tools and the coupling drive axis span a center plane, which runs between the second link axis and the fourth link axis.

15 Claims, 10 Drawing Sheets

(56) References Cited

U.S. PATENT DOCUMENTS

| | | | |
|---|---|---|---|
| 3,857,177 A | | 12/1974 | Karubian |
| 4,881,363 A | * | 11/1989 | Terai .................... A01D 34/404 |
| | | | 56/255 |
| 4,998,401 A | | 3/1991 | Terai |
| 5,027,591 A | | 7/1991 | Nakamura |
| 5,142,853 A | * | 9/1992 | Routery ............... A01D 34/412 |
| | | | 56/242 |
| 5,239,755 A | * | 8/1993 | Kramer .................. A01D 34/73 |
| | | | 30/263 |
| D342,425 S | * | 12/1993 | Watanabe .......................... D8/8 |
| 5,345,684 A | * | 9/1994 | Shoup .................. A01D 34/416 |
| | | | 248/610 |
| 5,651,418 A | * | 7/1997 | Jerez ....................... A01B 1/06 |
| | | | 172/14 |
| 5,865,155 A | * | 2/1999 | Nagashima ............. F02D 11/02 |
| | | | 123/398 |
| 6,401,472 B2 | | 6/2002 | Pollrich |
| 6,925,718 B2 | * | 8/2005 | Bartmann ............... B24B 23/02 |
| | | | 30/276 |
| 8,397,389 B2 | | 3/2013 | Geromiller |
| 9,097,249 B2 | | 8/2015 | Petersen |
| 2011/0113746 A1 | * | 5/2011 | Lin ........................ A01D 34/90 |
| | | | 56/320.1 |
| 2013/0276314 A1 | * | 10/2013 | Fukunaga .......... A01D 34/4165 |
| | | | 30/276 |
| 2017/0196166 A1 | * | 7/2017 | Filipowers .............. B60B 33/04 |

FOREIGN PATENT DOCUMENTS

| | | |
|---|---|---|
| EP | 0399503 A2 | 11/1990 |
| EP | 1736666 B1 | 12/2006 |
| EP | 2198691 B1 | 6/2010 |

\* cited by examiner

TOOL HEAD FOR A HAND-GUIDED IMPLEMENT AND IMPLEMENT HAVING A TOOL HEAD

CROSS-REFERENCE TO RELATED APPLICATIONS

The present application claims priority of EP 18 179 212.8, filed Jun. 22, 2018, the priority of this application is hereby claimed and these applications are incorporated herein by reference.

BACKGROUND OF THE INVENTION

The invention relates to a tool head and to an implement having a tool head.

From U.S. Pat. No. 4,998,401, a hand-guided implement for grass mowing, which has two back-and-forth rotating cutter disks as tools, is known. The cutter disks are driven via linkages.

In mowing implements of this type, high vibrations occur during operation due to the oscillating movement of the cutter disks and the therewith associated moved masses of the linkages.

SUMMARY OF THE INVENTION

The object of the invention is to provide a tool head for a hand-guided implement, in which the vibration excitation during operation is reduced. A further object of the invention lies in defining a hand-guided implement having reduced vibration excitation during operation. A further object of the invention lies in providing a tool head for a hand-guided implement, which tool head makes for easier working.

With respect to the tool head with reduced vibration excitation, this object is achieved by a tool head having a first rotatably mounted tool, a second rotatably mounted tool, a first linkage; and a second linkage. The first tool is drivable via the first linkage and the second tool is drivable via the second linkage. The tools are drivable via the linkages so as to rotate back and forth in opposite directions about a common rotational axis. The first linkage comprises a first drive member and a first coupling member and the second linkage comprises a second drive member and a second coupling member. The first drive member and the second drive member are mounted rotatingly about a common coupling drive axis. The first drive member is coupled to the first coupling member pivotably about a first link axis. The first coupling member is coupled to the first tool pivotably about a second link axis. The second drive member is coupled to the second coupling member pivotably about a third link axis. The second coupling member is coupled to the second tool pivotably about a fourth link axis. The first link axis and the third link axis have an angular spacing about the common coupling drive axis of the drive members. The rotational axis of the tools and the coupling drive axis span a center plane that runs between the second link axis and the fourth link axis. With respect to the implement, the object is achieved by an implement having a drive motor having a drive shaft, and a tool head including a drive pinion, a first rotatably mounted tool, and a second rotatably mounted tool, a first linkage and a second linkage. The first tool is drivable via the first linkage and the second tool is drivable via the second linkage. The tools are drivable via the linkages so as to rotate back and forth in opposite directions about a common rotational axis, wherein the first linkage comprises a first drive member and a first coupling member. The second linkage comprises a second drive member and a second coupling member, the first drive member and the second drive member are mounted rotatingly about a common coupling drive axis. The first drive member is coupled to the first coupling member pivotably about a first link axis, and the first coupling member is coupled to the first tool pivotably about a second link axis. The second drive member is coupled to the second coupling member pivotably about a third link axis, and the second coupling member is coupled to the second tool pivotably about a fourth link axis. The first link axis and the third link axis have an angular spacing about the common coupling drive axis of the drive members. The rotational axis of the tools and the coupling drive axis span a center plane that runs between the second link axis and the fourth link axis. The drive shaft is connected in a rotationally secure manner to the drive pinion of the tool head. With respect to the tool head which makes for easier working, the object is achieved by a tool head having at least one rotatably mounted tool, wherein the at least one tool is drivable so as to rotate back and forth about a rotational axis and the tool has a cutting plane, and a stand component that has a peripheral wall that projects through the cutting plane. The peripheral wall is bounded in a peripheral direction by a first end face and a second end face. The end faces, in the cutting plane, form an angle of less than 60° about the rotational axis. The peripheral wall between the first end face and the second end face has at least one recess that extends into the cutting plane and separates two portions of the peripheral wall from one another.

It has been shown that the vibration excitation during operation can be considerably reduced if the second link axis, at which the first coupling member is coupled to the first tool, and the fourth link axis, at which the second coupling member is pivotably coupled to the second tool, are arranged on opposite sides of a center plane which is spanned by the rotational axis of the tools and the coupling drive axis. According to the invention, the center plane therefore runs between the second link axis and the fourth link axis. It has been shown that, due to the arrangement of the center plane between the second link axis and the fourth link axis, in particular the transmission forces of the second transmission unit at least partially, in particular fully, balance out. As a result, the occurring vibrations during operation can be markedly reduced.

In a particularly advantageous embodiment, the center plane runs midway between the second link axis and the fourth link axis. An arrangement in which the center plane is not arranged midway between the second and the fourth link axis can also, however, be advantageous.

The first coupling member is coupled to the first tool pivotably about a second link axis. The first coupling member here does not have to be connected directly to the first tool, but can be connected indirectly, for instance via an arm connected in a rotationally secure manner to the first tool, at the second link axis to the first tool. Correspondingly, the second coupling member can be coupled to the second tool, pivotably about the fourth link axis, directly or indirectly, for instance via an arm connected in a rotationally secure manner to the tool. A marked reduction of the transmission forces is able to be achieved in particular when the second link axis and the fourth link axis are arranged symmetrically to the center plane.

The first drive member advantageously has a first drive member axis, which connects the coupling drive axis to the first link axis. Advantageously, the second drive member has a second drive member axis, which connects the coupling drive axis to the third link axis. The first drive member axis and the second drive member axis form, in a direction of view in the direction of the coupling drive axis, an angle which advantageously is smaller than 180°, in particular smaller than 140°, preferably smaller than 100°, particularly preferably smaller than 90°. The angle advantageously amounts to at least 10°.

The first coupling member advantageously has a first coupling member axis, which connects the first link axis to the second link axis, and the second coupling member has a second coupling member axis, which connects the third link axis to the fourth link axis. The two linkages are advantageously arranged such that, when viewed in the direction of the coupling drive axis, a first drive angle between the first drive member axis and the first coupling member axis, and a second drive angle between the second drive member axis and the second coupling member axis, are equal for each setting of the linkages. As a result, a broad mass balance during operation is achieved.

The drive member axes and the coupling member axes are imaginary straight connecting lines, which indicate the geometric arrangement of the links of the linkages. The drive members and coupling members can run along the respective drive member axes and coupling member axes respectively, or can have a differing path.

Advantageously, the first linkage and the second linkage are configured such that the first coupling member and the second coupling member, during operation, do not rotate about the first link axis and the third link axis respectively, but swing back and forth about the first link axis and the third link axis respectively.

Advantageously, the tool head has a transmission comprising a drive pinion and a ring gear. The ring gear is advantageously connected in a rotationally secure manner to the drive members of the linkages. The radius of the ring gear advantageously amounts to at least 3.5 times, in particular at least 5 times, the distance of the first link axis from the coupling drive axis. The radius of the ring gear advantageously amounts to at least 3.5 times, in particular at least 5 times, the distance of the third link axis from the coupling drive axis. Since the ring gear is comparatively large, the ring gear acts as a flywheel. As a result, a uniform, powerful movement of the tools is achieved.

Advantageously, at least one portion of the ring gear is arranged between the drive members and the tools. The drive members are therefore located on one side of the ring gear, and the tools on the other, opposite side of the ring gear. At least a portion of the ring gear is arranged in the installation space, which, related to the direction of the rotational axis of the tools, is located between the drive members and the tools. As a result, a compact structure is obtained. Preferably, the drive pinion meshes with the ring gear. Further transmission steps between drive pinion and ring gear are therefore advantageously not provided. The drive pinion is here the input pinion of the transmission. The drive pinion preferably has a connecting contour for the rotationally secure connection to a drive shaft of the implement. The drive pinion is therefore provided for the rotationally secure connection to the drive shaft without the interposition of further transmission steps. In particular in the case of a comparatively large ring gear, a sufficiently large reduction of the rotation speed can already be achieved with one transmission step.

Advantageously, at least one coupling member is coupled to the assigned tool via an output member, wherein the output member is connected in a rotationally secure manner to the assigned tool. Since the coupling member is not connected directly to the assigned tool, but via an output member, an advantageous arrangement of the components is possible. At least one output member is here advantageously pivotable through less than 360° about the rotational axis of the tools. The output members do not during operation perform a circumferential, rotating movement, but rather a movement which pivots back and forth. In the end positions of the linkages, the connection of the second link axis to the rotational axis and the connection of the fourth link axis to the rotational axis preferably form an angle which amounts to 10° to 180°, in particular 70° to 140°.

Advantageously, it is provided that the first tool is fixed to a sleeve, and the second tool is fixed to a shaft which projects through the sleeve. As a result, a compact structure is achieved.

Advantageously, with each stroke movement, more than one cut is executed. The drive members are advantageously driven in a revolving manner. For each revolution of the drive members, advantageously more than two, in particular more than three, preferably four cutting events, are executed. Advantageously, at least one tool possesses at least one cutting edge, which, with each movement in one direction, brushes over two counter edges of the other tool. The counter edges can here be counterstays. In a preferred embodiment, the counter edges are also, however, realized as cutting edges. Since the at least one cutting edge brushes over two counter edges of the other tool, with each movement in one direction two cuts are executed. Advantageously, for each rotational direction, at least one cutting edge is provided. Advantageously, for a first rotational direction of the tool, at least one cutting edge brushes over two counter edges of the other tool upon the movement in the first rotational direction and, for a second rotational direction of the tool, at least one further cutting edge brushes over two further counter edges of the other tool upon the movement in the second rotational direction. As a result, four cuts are obtained per revolution of the drive members. The two cuts in one direction are here preferably executed at different cutting speeds. A very good cutting result is thereby achieved. It can, however, also be provided that, with each stroke movement, only one cut is executed.

For one implement, it is provided that the implement has a drive motor, a drive shaft and a tool head. The drive shaft is connected to a drive pinion of the tool head, advantageously in a rotationally secure manner. Additional transmission steps between drive shaft and drive pinion are therefore not provided. The drive shaft is advantageously, at least within an operating speed range, connected in a rotationally secure manner to a motor output shaft of the drive motor. It can be provided that the motor output shaft and the drive shaft are connected to each other in a rotationally secure manner or are configured as a single shaft. In an alternative preferred embodiment, a clutch, preferably a centrifugal clutch, is arranged between the motor output shaft and the drive shaft. Advantageously, the clutch, if a constructionally prescribed rotation speed is exceeded, establishes a rotationally secure connection between motor output shaft and drive shaft.

The rotation speed of the motor output shaft of the drive motor and the rotation speed of the drive pinion are, in the case of driven tools, advantageously equal. The rotation speed of the drive pinion during operation advantageously amounts to at least 5,000 revolutions per minute. In a preferred embodiment, the drive pinion, during operation, is driven at a rotation speed of at least 8,000 revolutions per minute. Since the cutting head is designed to be driven at very high rotation speed, the tool head can flexibly be used on different implements, and the drive motor can be an electric motor or a combustion engine, without the need for a transmission between the drive motor and the drive pinion. However, it can also be provided that a transmission is arranged in the motor housing.

For a tool head for a hand-guided implement, comprising at least one rotatably mounted tool, wherein the tool is drivable such that it rotates back and forth about a rotational axis, and wherein the tool has a cutting plane, it is provided that the tool head has a stand component, wherein the stand component has a peripheral wall, which projects through the cutting plane, wherein the peripheral wall is bounded in the peripheral direction by a first end face and a second end face, wherein the end faces, in the cutting plane, form an angle of less than 60° about the rotational axis, and wherein the peripheral wall between the first end face and the second end face has at least one recess, wherein the recess extends into the cutting plane and separates two portions of the peripheral wall one from the other.

The two portions form two defined support points for the planting of the implements on the ground. The support points are designed in particular in planar configuration as support surfaces. The support surfaces advantageously form an angle of 20° to 40° with the cutting plane. The support surfaces lie in particular in a common support plane. The support plane advantageously runs parallel to a guide tube fitted to the tool head. A stable, defined support for the planting of the implement is thereby created. As a result of the recess, the at least one tool is clearly visible for the operator also from a position in extension of the guide tube, so that the peripheral wall of the stand component does not impair the execution of exact cuts with the implement.

Advantageously, the angle over which the recess extends in the cutting plane about the rotational axis is greater than the angle over which a portion of the peripheral wall, in particular both mutually separated portions of the peripheral wall, extend in the cutting plane respectively about the rotational axis. In the case of a peripheral wall having precisely two portions which are separated by a recess, the recess hence extends over more than one-third of the peripheral wall in the cutting plane. Since the recess is comparatively large, the operator has through the recess a good view of the at least one tool.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
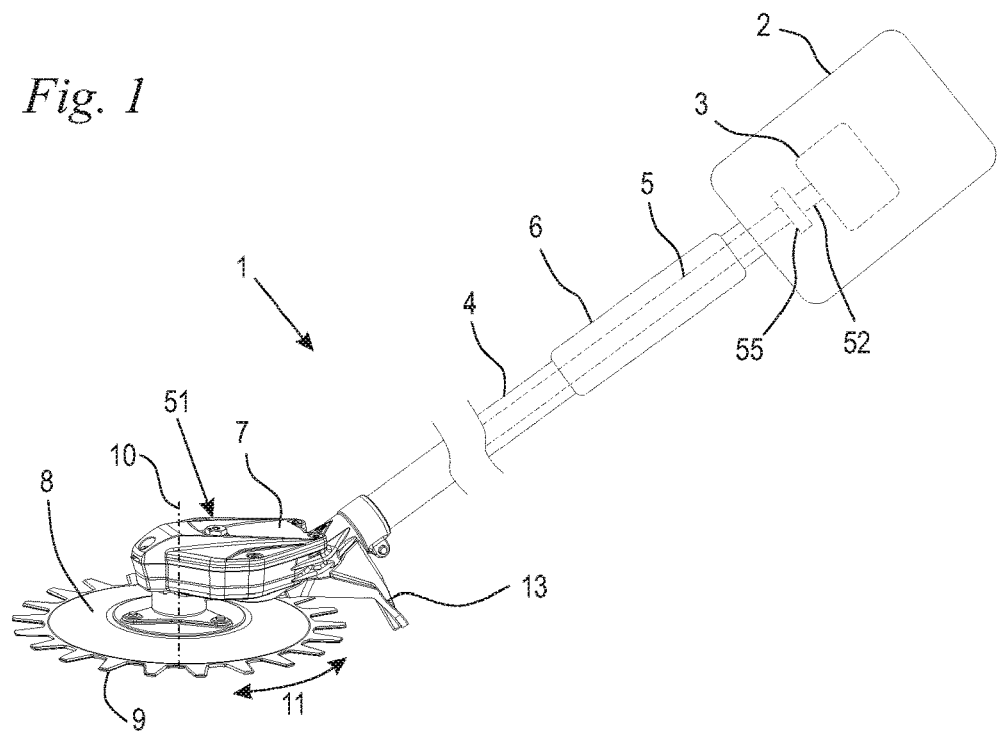
FIG. 1 shows a schematic representation of a hand-guided implement.

FIG. 1 shows schematically a hand-guided implement 1. In the illustrative embodiment, the hand-guided implement 1 is a rotary brush cutter. The hand-guided implement 1 possesses a motor housing 2 and a tool head 51. In the illustrative embodiment, the motor housing 2 and the tool head 51 are connected to each other via a guide tube 4. In the motor housing 2 is arranged a drive motor 3. The drive motor 3 can be an electric motor or a combustion engine, in particular a two-stroke engine or a mixture-lubricated four-stroke engine. The drive motor 3 possesses a motor output shaft 52, which in the illustrative embodiment is connected via a clutch 55 to a drive shaft 5. The drive shaft 5 projects through the guide tube 4 down to the tool head 7. A clutch 55 is in particular provided when the drive motor 3 is a combustion engine. In the illustrative embodiment, there is no transmission arranged between the motor output shaft 52 and the drive shaft 5. The drive shaft 5 rotates above the engagement speed at the same rotation speed as the motor output shaft 52. If the drive motor 3 is constituted by an electric motor, then the motor output shaft 52 can also be a transmission output shaft of a transmission arranged in the motor housing 2. Advantageously, the rotation speed of the motor output shaft 52 and of the drive shaft 5 amounts to at least 5,000 revolutions per minute. Preferably, at least 8,000 revolutions per minute are provided.

It can also be expedient to arrange a drive motor 3, configured as an electric motor, at that end of the guide tube 4 at which the tool head 51 is arranged, and to arrange at the other end of the guide tube 4 a power supply for the electric motor.

On the guide tube 4 is arranged, in the illustrative embodiment, a handle 6, which encompasses the guide tube 4. The handle 6 can also be configured as a bow-shaped handle or be differently configured. An arrangement of one or more handles on the motor housing 2 can also be advantageous.

The tool head 51 possesses a tool head housing 7, which is fixed on the guide tube 4. On the tool head 51 are provided two tools 8 and 9, which are driven such that they rotate back and forth about a rotational axis 10. The tools 8 and 9 here move, as indicated by the double arrow 11 in FIG. 1, in opposite directions to each other. In the illustrative embodiment, the tools 8 and 9 are provided as circular cutter disks. Another embodiment of the tools 8 and 9, in particular a circular-segment-shaped embodiment, can, however, also be advantageous. Extending on the peripheral region of the tools 8 and 9 is a stand component 13.

Figure 2:
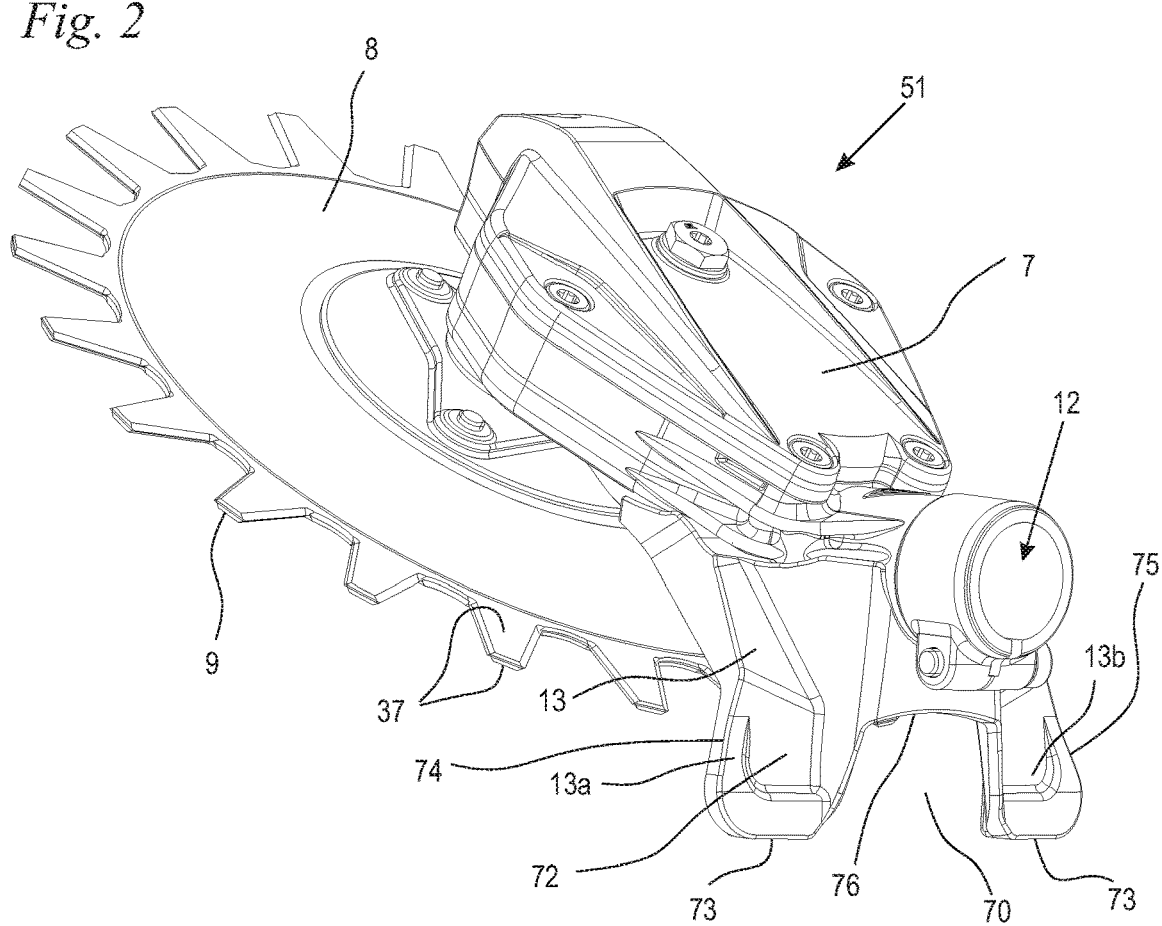
FIG. 2 shows the tool head of the implement from FIG. 1 in perspective representation.

As is shown by FIG. 2, the tools 8 and 9 respectively possess a multiplicity of teeth 37. The tools 8 and 9 are configured as cutter disks. In the illustrative embodiment, the teeth 37 in both tools 8 and 9 are arranged evenly distributed over the periphery. At the reversal points of the tools 8 and 9, the teeth 37 of the two tools 8 and 9 overlap one another. This position of the tools 8 and 9 is represented in FIGS. 1 and 2. It can also be provided that the tools 8 and 9 are different in shape. Advantageously, the moments of inertia of the tools 8 and 9 are equal. It can also be provided to configure one of the tools 8, 9 heavier than the other of the tools 8, 9 and to drive the heavier tool 8, 9 more slowly.

The teeth 37 of the tools 8 and 9 act in a shear-like manner and shear off cuttings such as grass, for instance.

In an alternative embodiment, it can be provided that the tools 8, 9 have teeth 37 only over a portion of their periphery. In this alternative embodiment, the teeth 37 of the tools 8 and 9 are advantageously arranged such that the teeth 37 of the two tools 8, 9 overlap, at least partially, during a movement of the tools 8, 9 respectively to a rotational direction.

As is also shown by FIG. 2, the tool head housing 7 possesses a socket 12, into which the guide tube 4 can be inserted and fixed therein. The tool head 51 further possesses the stand component 13, which in the illustrative embodiment is arranged on that side of the socket 12 that, during operation, is facing toward the ground. The design of the stand component 13 constitutes a distinct inventive concept, independent from the drive of the at least one tool 8, 9. The design of the stand component 13 is also shown in FIGS. 18 to 21 in detail.

The stand component 13 possesses a peripheral wall 72, which runs on the outer periphery of the tools 8 and 9. The peripheral wall 72 is bounded in the peripheral direction by a first end face 74 and a second end face 75. The peripheral wall 72 possesses a recess 70, which separates two portions 13a and 13b of the peripheral wall 72 one from the other. There can also be provided a plurality of recesses 70 and more than two portions of the peripheral wall 72. The recess 70 is arranged, in the peripheral direction, in a region of the peripheral wall 72 between the first end face 74 and the second end face 75. The stand component 13 possesses a bottom side 73, with which the stand component 13 can be planted on the ground. The recess 70 extends from the plane of the bottom side 73 up to a top side 76 of the recess 70.

Figure 19:
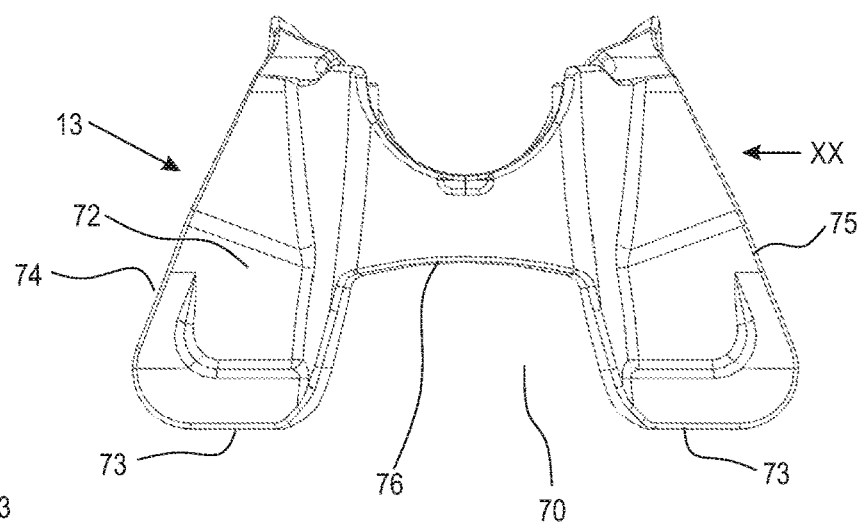
FIG. 19 shows a side view of the stand component from the side facing away from the tool head, in the direction of the arrow XIX in FIG. 20 in the position in which the stand component is in a state planted on the ground.
Figure 20:
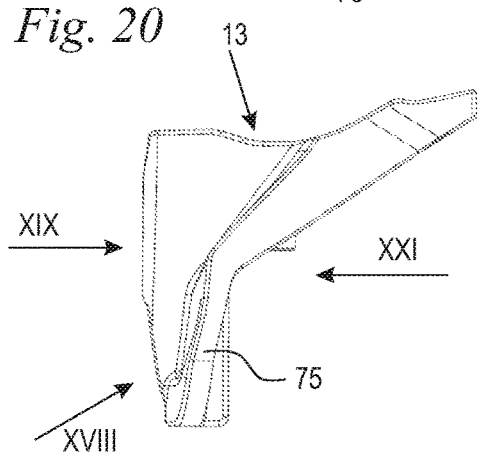
FIG. 20 shows a side view of the stand component in the direction of the arrow XX in FIG. 19.
Figure 21:
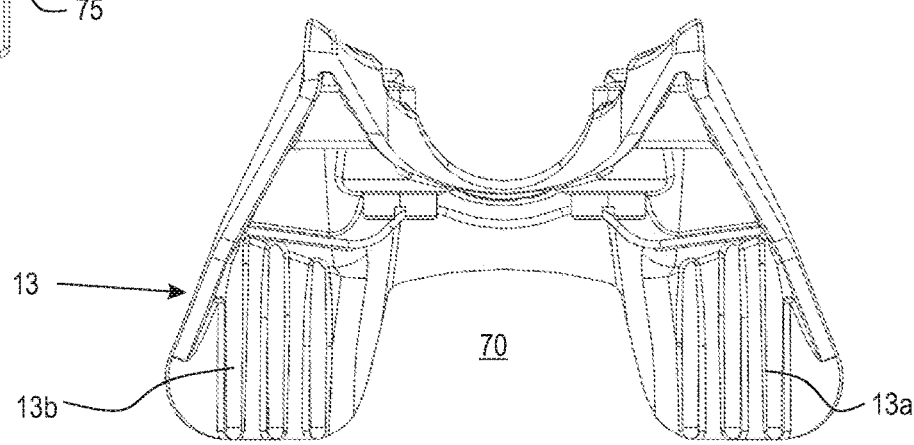
FIG. 21 shows a side view of the stand component from the side facing toward the tool head, in the direction of the arrow XIX in FIG. 20.

FIGS. 19 to 21 show the stand component 13 in the position in which the stand component 13 is found when planted on the ground. In this position, the guide tube 4 of the implement 1 advantageously runs approximately parallel to the ground. The bottom sides 73 are configured as faces, which, during operation of the implement 1, run at an angle to the ground. When planted on the ground, the bottom sides 73 advantageously lie parallel to the ground and rest full-facedly on the ground. In this position, the tools 8 and 9 run at an angle to the ground and advantageously do not touch the ground.

Figure 4:
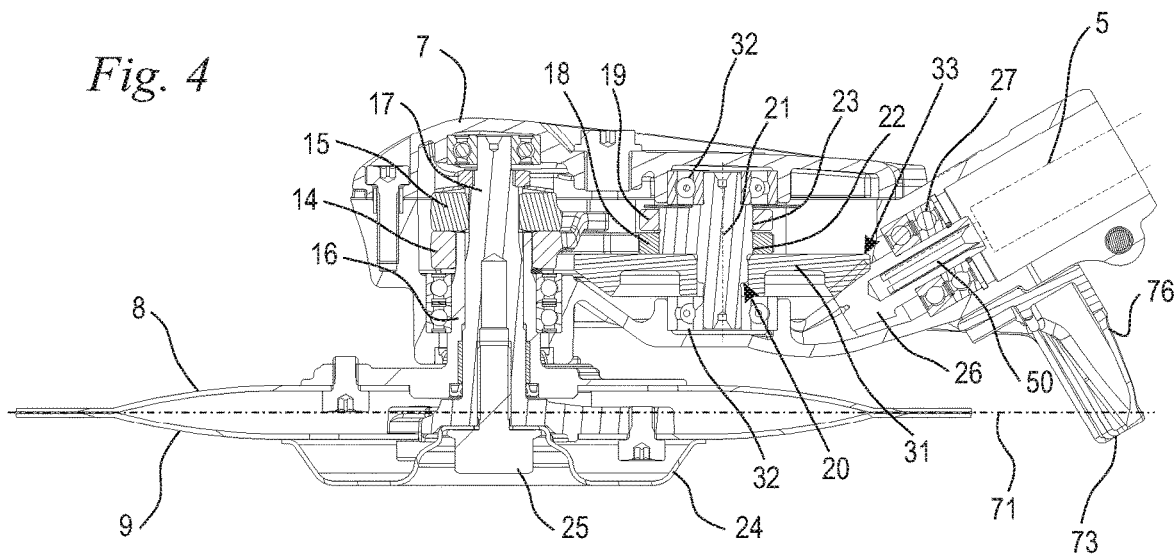
FIG. 4 shows a cut along the line IV-IV in FIG. 3.

As is shown by FIG. 4, the tools 8 and 9 form a cutting plane 71. The cutting plane 71 is the plane in which the tools 8 and 9 execute a cut. That is the plane in which the front edges of the teeth 37 lie. As is shown by FIG. 4, the cutting plane 71 intersects the portions 13a and 13b of the peripheral wall 72 of the stand component 13. The peripheral wall 72 therefore projects through the cutting plane 71. The top side 76 of the recess 70 and the bottom side 73 of the peripheral wall 72 lie on opposite sides of the cutting plane 71. The recess 70 extends through the cutting plane 71.

Figure 3:
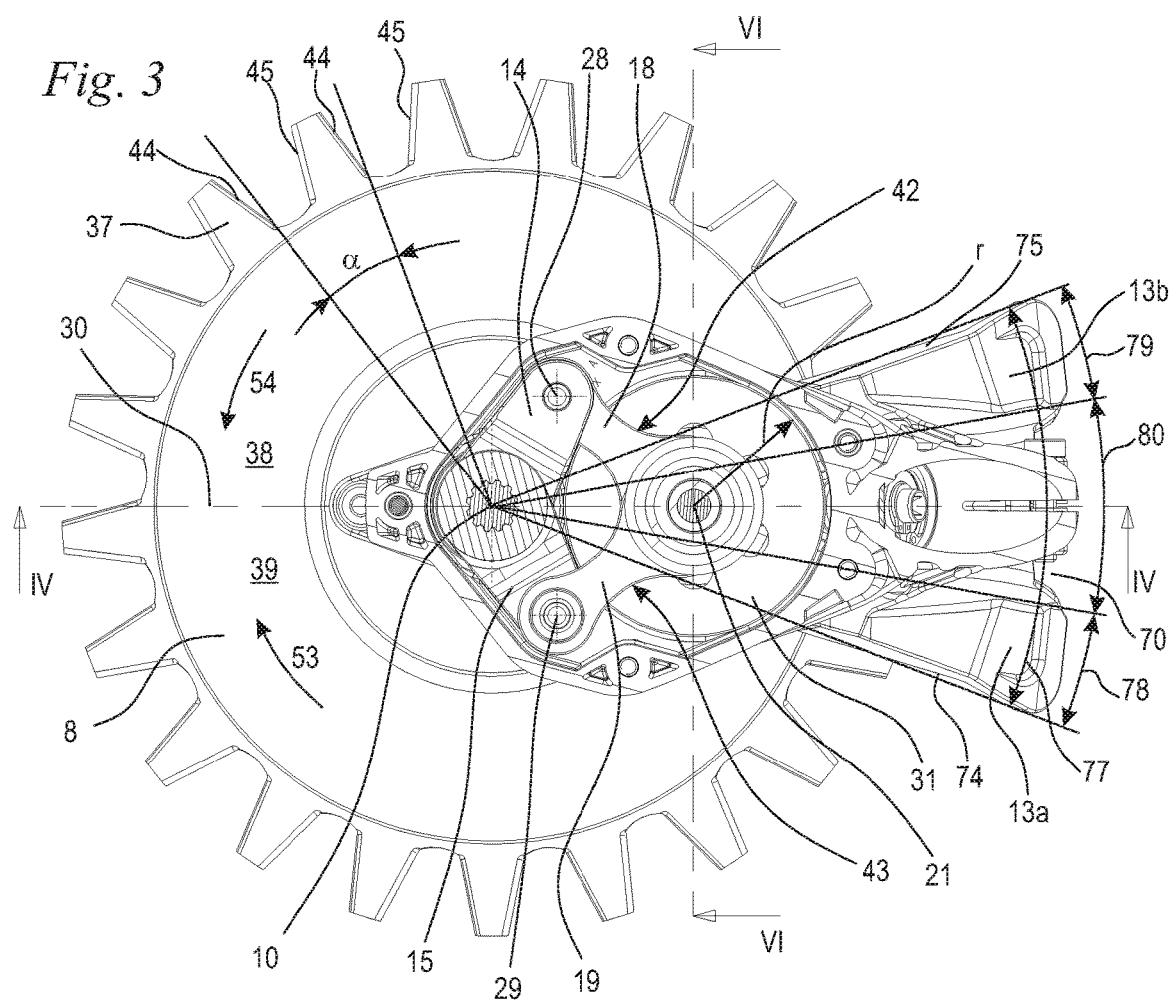
FIG. 3 shows a sectional representation of the tool head from FIG. 2.

In FIG. 3, the extent of the portions 13a and 13b, and the extent of the recess 70 of the peripheral wall 72, in the peripheral direction about the rotational axis 10 is shown. The extent of the peripheral wall 72 is here measured in the cutting plane 71. The peripheral wall 72 extends from the first end face 74 to the second end face 75 in the cutting plane 71 over an angle 77 about the rotational axis 10. The angle 77 advantageously amounts to less than 60°. Preferably, the peripheral wall 72 is configured symmetrically to a plane of symmetry which runs perpendicular to the cutting plane 71 and which contains the rotational axis 10. This plane of symmetry corresponds to the cutting plane in FIG. 4. The end faces 74 and 75 possess to this plane of symmetry advantageously an angular spacing of less than 30° about the rotational axis 10. The plane of symmetry advantageously corresponds to the center plane 30 of the tool head 51. The center plane 30 runs through the rotational axis 10 and the coupling drive axis 21.

The recess 70 extends in the cutting plane 71 over an angle 80 about the rotational axis 10. The recess is advantageously configured symmetrical to the plane of symmetry, in particular to the center plane 30. The portion 13a extends in the cutting plane 71 over an angle 78 about the rotational axis 10. The portion 13b extends in the cutting plane 71 over an angle 79 about the rotational axis 10. The angles 78 and 79 are advantageously equally large. The angle 80 is advantageously greater than the angle 78 and greater than the angle 79.

As is shown by FIG. 3, the tool head 51 has a first linkage 42 for driving of the first tool 8, and a second linkage 43 for driving of the second tool 9. In the illustrative embodiment, the tool 8 is arranged facing toward the tool head housing 7, as also shown by FIG. 4. The second tool 9 lies on that side of the first tool 8 that is facing away from the tool head housing 7.

Figure 9:
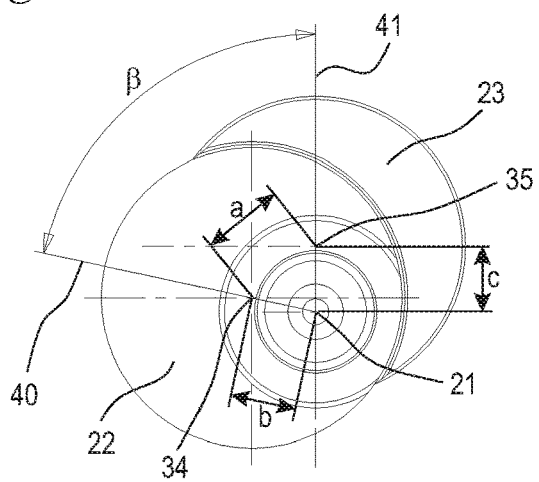
FIG. 9 shows a side view of the eccentric component in the direction of the arrow IX in FIG. 8.
Figure 10:
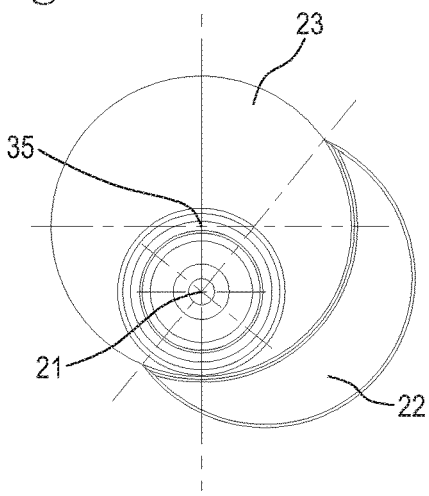
FIG. 10 shows a side view of the eccentric component in the direction of the arrow X in FIG. 8.

The first linkage 42 comprises a first drive member 22 (FIG. 4), a first coupling member 18 and a first output member 14. The first drive member 22 and the first output member 14 are mounted rotatably in relation to the tool head housing 7. The first drive member 22 is configured, as shown by FIG. 9, as an eccentric, and is mounted rotatably in the tool head housing 7. The first drive member 22 is driven, during operation, rotatingly about a coupling drive axis 21 represented in FIGS. 3 and 4. The first drive member 22 is coupled to the first coupling member 18 pivotably about the first link axis 34 shown in FIG. 9. The first coupling member 18 is coupled to the first output member 14 pivotably about the second link axis 28 shown in FIG. 3. The first output member 14 is mounted rotatably in the tool head housing 7. The first output member 14 is connected in a rotationally secure manner to the first tool 8. Alternatively, it can be provided that the first coupling member 18 is pivotably connected, at the link axis 28, directly to the first tool 8. The first linkage 42 is a linkage comprising four members, which are formed by the first drive member 22, the first coupling member 18, the first output member 14, and the tool head housing 7.

The second linkage 43 comprises a second drive member 23 (FIG. 4), a second coupling member 19, and a second output member 15. As is shown by FIG. 9, the second drive member 23 is configured as an eccentric. During operation, the second drive member 23 is driven jointly with the first drive member 22 rotatingly about the coupling drive axis 21. The second drive member 23 is coupled to the second coupling member 19 pivotably about the third link axis 35 shown in FIG. 9. The second coupling member 19 is coupled to the second output member 15 pivotably about a fourth link axis 29. The second output member 15 is connected in a rotationally secure manner to the second tool 9. Alternatively, it can here too be provided that the second coupling member 19 is directly coupled to the second tool 9 at the link axis 29. The second linkage 43 is a linkage comprising four members, which are formed by the second drive member 23, the second coupling member 19, the second output member 15, and the tool head housing 7.

In the illustrative embodiment, the two drive members 22 and 23 are configured, as shown by FIG. 4, on a common eccentric component 20, and mounted rotatably about the common coupling drive axis 21. The eccentric component 20 is connected in a rotationally secure manner to a ring gear 31. The ring gear 31 meshes with a drive pinion 26. The drive pinion 26 is connected in a rotationally secure manner to the drive shaft 5. For the rotationally secure connection of the drive pinion 26 to the drive shaft 5, there is provided in the drive pinion 26 a connecting contour 50, in which the drive shaft 5 engages. The drive pinion 26 thereby rotates at the same rotation speed as the motor output shaft 52 (FIG. 1). In the illustrative embodiment, no additional transmission step is provided between the ring gear 31 and the drive pinion 26. In order, however, to achieve a comparatively low rotation speed of the ring gear 31, the ring gear 31 is of comparatively large configuration. As is shown by FIG. 3, the ring gear 31 possesses a greatest radius r. The greatest radius r is half the greatest diameter of the ring gear 31.

As is shown by FIG. 4, the first output member 14 is connected in a rotationally secure manner to a sleeve 16, which, for its part, is fixedly connected to the first tool 8. The second output member 15 is connected in a rotationally secure manner to a shaft 17, which projects through the sleeve 16 onto that side of the tool 8 that is facing away from the tool head housing 7. To the shaft 17 is fixed, in a rotationally secure manner, the second tool 9. On the tool 9 is further arranged a cover 24, which protects the connection of the shaft 17 to the second tool 9 from dirt contamination and which is fixed with a fastening bolt 25 to the shaft 17. In working with the implement 1, the cover 24 forms a support point. For the planting of the implement 1, two support points are formed by the bottom side 73 of the peripheral wall 73 in the two portions 13a and 13b. A defined support in the planting of the implement 1 is thereby ensured.

As is also shown by FIG. 4, the eccentric component 20 is mounted with bearings 32 in the tool head housing 7. In the illustrative embodiment, the bearings 32 are configured as roller bearings. The drive pinion 26 and the ring gear 31, which intermesh, form a transmission 33, which is configured as a reduction gear. The drive pinion 26 is rotatably mounted with bearings 27 in the tool head housing 7.

As is shown by FIGS. 3 and 4, the coupling members 18 and 19 lie on that side of the ring gear 31 that is facing away from the tools 8 and 9. As is shown in particular by FIG. 4, the drive members 22 and 23 too lie on that side of the ring gear 31 that is facing away from the tools 8 and 9. Related to the direction of the coupling drive axis 21 or of the rotational axis 10, the ring gear 31 extends at least partially between the drive members 22 and 23 and the tools 8 and 9. Since the ring gear 31 projects between the drive members 22 and 23 and the tools 8 and 9, a compact structure and a small structural size of the arrangement are obtained.

As is shown by FIG. 3, the tool head 51 possesses a center plane 30. The center plane 30 is spanned by the rotational axis 10 of the tools 8 and 9 and the coupling drive axis 21. As is shown by FIG. 3, the second link axis 28 lies on a first side 38 of the center plane 30. The fourth link axis 29 lies on a second side 39 of the center plane 30. The link axes 28 and 29 lie on opposite sides of the center plane 30. The center plane 30 extends between the second link axis 28 and the fourth link axis 29. The output members 14 and 15 are arranged in mirror symmetry to the center plane 30. As a result, the vibrations which arise during operation and which are generated by the linkages 42 and 43 can be minimized.

As is also shown by FIG. 3, the first tool 8 possesses on the teeth 37 respectively a cutting edge 44, which, in a first rotational direction 53, is arranged ahead of the respective assigned teeth 37. In the illustrative embodiment, the teeth 37 further respectively possess a cutting edge 45, which, related to an oppositely directed, second rotational direction 54, is arranged ahead of the assigned tooth 37. In a top view of the first tool 8, the first rotational direction 53 is oriented clockwise, and the second rotational direction 54 counterclockwise, from the tool head housing 7.

As is shown by FIG. 3, cutting edges 44 of adjacent teeth 37 are arranged at an angular spacing $\alpha$, which, in the illustrative embodiment, corresponds to the spacing of the teeth. In the illustrative embodiment, twenty-one teeth 37 are evenly distributed over the periphery. In the illustrative embodiment, the angular spacing $\alpha$ amounts to about 17°. Advantageous values for the angular spacing $\alpha$ are 10° to 30°. The angular spacing $\alpha$ is here respectively measured from the same point on each cutting edge 44 to the corresponding point on the adjacent cutting edge 44. Advantageously, the angular spacing $\alpha$ is measured on the radially inner sides of the cutting edges 44.

Figure 5:
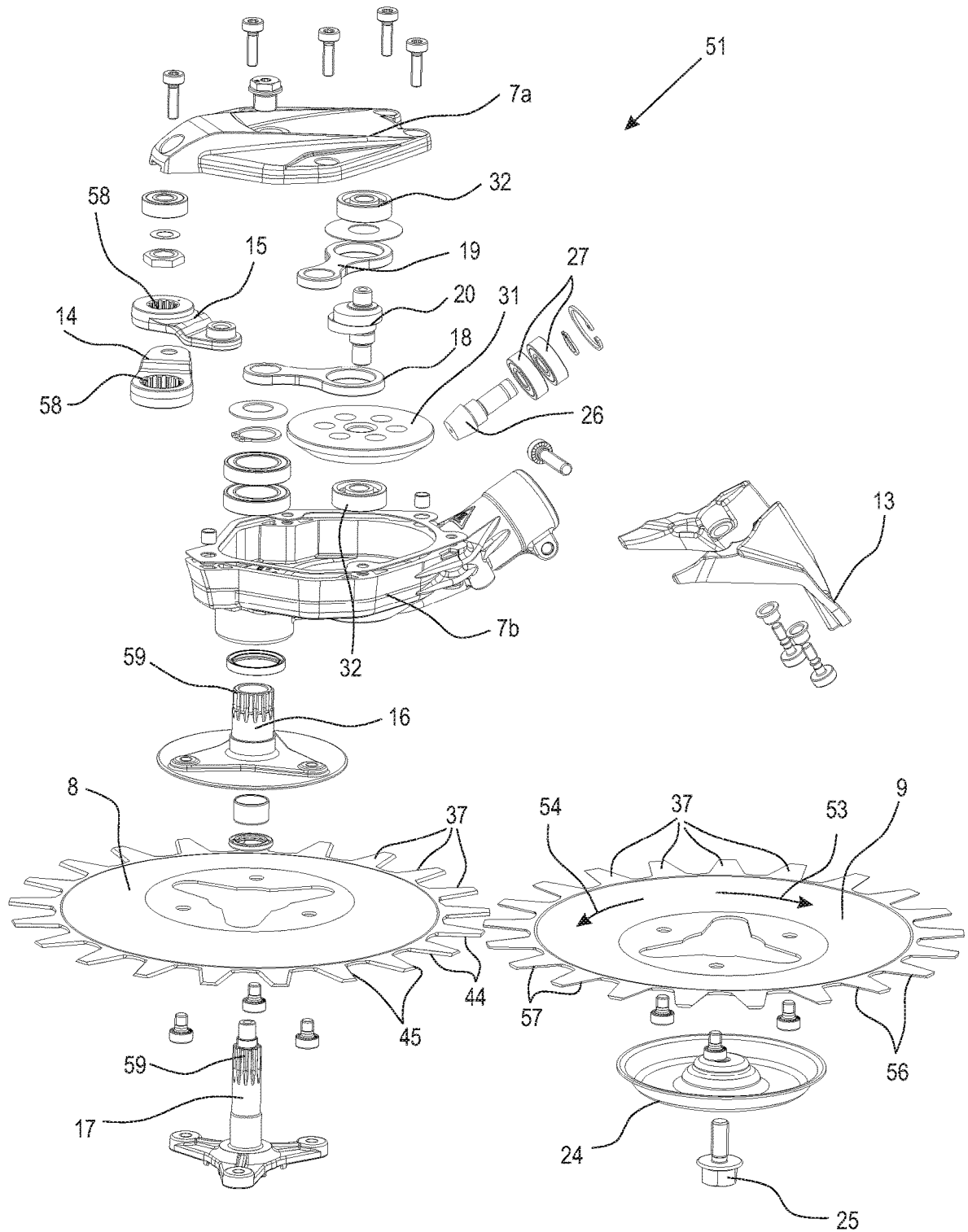
FIG. 5 shows an exploded representation of the tool head.

FIG. 5 shows the structure of the tool head 51 in detail. The tool head housing 7 possesses an upper tool head housing part 7a and a lower tool head housing part 7b. The ring gear 31 and the eccentric component 20 are mounted with bearings 32 in the tool head housing 7 rotatably about the coupling drive axis 21 (FIG. 4). The coupling members 18 and 19 are pivotably coupled to the output members 14 and 15. The output members 14 and 15 possess toothings 58, which are in engagement with counter toothings 59 on the sleeve 16 or the shaft 17 and thus establish a rotationally secure connection between the first output member 14 and the sleeve 16 or the second output member 15 and the shaft 17. As is also shown by FIG. 5, the teeth 37 of the second tool 9 possess cutting edges 56 and cutting edges 57. In the case of a rotation in the first rotational direction 53, the cutting edges 56 lie ahead of the respective tooth 37, while, in the case of a rotation in the second rotational direction 54, the cutting edges 57 lie ahead of the respective teeth 37.

Advantageously, the distance which each tooth 37 covers during a revolution of the eccentric component 20 corresponds to the angular spacing α. Since the blades 8 and 9 move in opposite directions, each cutting edge 44, when moved in the first rotational direction 53, brushes over two cutting edges 57, lying to the fore in the second rotational direction 54, of the teeth 37 of the second tool 9. Upon the return movement, each cutting edge 45 brushes over two cutting edges 56, lying to the fore in the first rotational direction 53, of the second tool 9. With each revolution of the eccentric component 2, four cutting events in total are thereby obtained, namely two cutting events in which cutting edges 44 cooperate with cutting edges 47 and two cutting events in which cutting edges 45 cooperate with cutting edges 46. The two cutting events, which take place during a movement of the tools 8 and 9 in one direction, here take place at different speeds.

Figure 6:
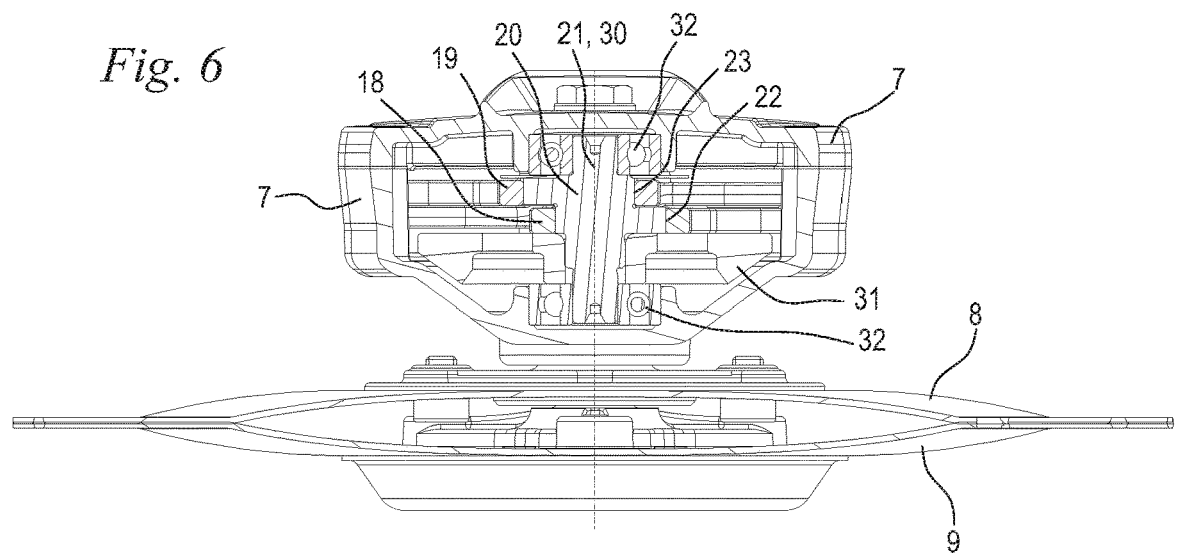
FIG. 6 shows a section along the line VI-VI in FIG. 3.
Figure 7:
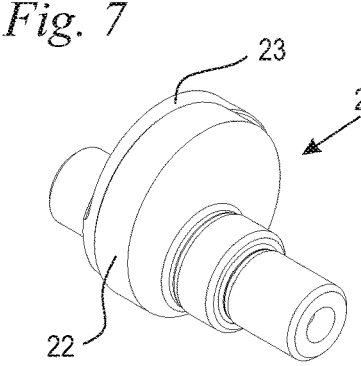
FIG. 7 shows a perspective representation of an eccentric component of the tool head.
Figure 8:
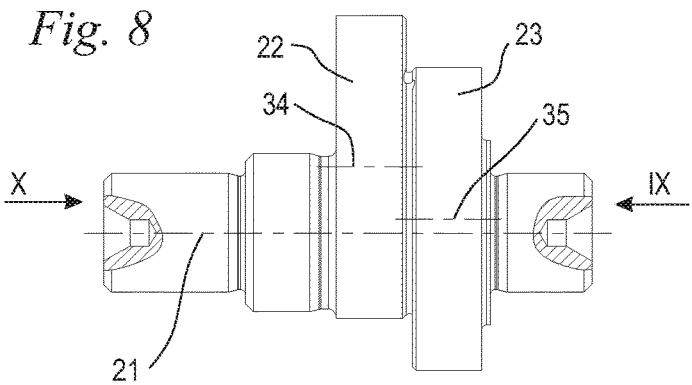
FIG. 8 shows a partially sectioned view of the eccentric component from FIG. 7.

The mounting of the eccentric component 20 in the tool head housing 7 is shown in FIG. 6. In FIG. 6, the arrangement of the ring gear 31 partially between the coupling members 18 and 19 and the tools 8 and 9 is also shown. As is also shown by FIG. 6, the ring gear 31 is also arranged partially between the drive members 22, 23 and the tools 8 and 9. The drive members 22 and 23 are arranged on that side of the ring gear 31 that is facing away from the tools 8 and 9.

In FIGS. 7 to 10 is shown the eccentric component 20. The eccentric component 20 is configured in one piece and forms with a first eccentric the drive member 22, and with a second eccentric the drive member 23. The first link axis 34 is the center axis of the eccentric which forms the drive member 22. The third link axis 35 is the center axis of the eccentric portion which forms the second drive member 23. In an alternative embodiment, the drive members 22 and 23 could also be formed by linkage levers which are mounted rotatably about the coupling drive axis 21 and, at the link axes 34 and 35, are respectively articulately connected to one of the coupling members 18 and 19.

The first drive member 22 possesses a first drive member axis 40 illustrated in FIG. 9. The first drive member axis 40 extends between the articulation points coupling drive axis 21 and first link axis 34. In the dead center positions of the first linkage 42, the first drive member axis 40 and the first coupling member axis 48 are in alignment, thus lie in a line. The second drive member 23 possesses a second drive member axis 41. The second drive member axis 41 extends between the articulation points coupling drive axis 21 and third link axis 35. In the dead center positions of the second linkage 43, the second drive member axis 41 and the second coupling member axis 49 are in alignment, thus lie in a line. The first linkage 42 and the second linkage 43 run through their dead center positions advantageously simultaneously.

As is shown by FIG. 9, the drive member axes 40 and 41 form an angle β. The angle β is advantageously greater than 0°. The angle β between the first drive member axis 40 and the second drive member axis 41 is, for each possible position of the linkages 42 and 43 during operation, smaller than 180°. The angle β is advantageously smaller than 140°, preferably smaller than 100°, particularly preferably smaller than 80°.

As is shown by FIG. 9, the link axes 34 and 35 possess a spacing a. The first link axis 34 possesses to the coupling drive axis 21 a distance b. The third link axis 35 possesses to the coupling drive axis 21 a distance c. In the illustrative embodiment, the distances b and c are equally large. The distance a advantageously amounts to 0.8 times to 1.5 times the distance b or the distance c. The radius r of the ring gear 31 (FIG. 3) advantageously amounts to at least 3.5 times, in particular at least 5 times, the distance b of the first link axis 34 from the coupling drive axis 21. Preferably, the radius r of the ring gear 31 amounts to at least 3.5 times, preferably at least 5 times, the distance c of the third link axis 35 from the coupling drive axis 21.

Figure 11:
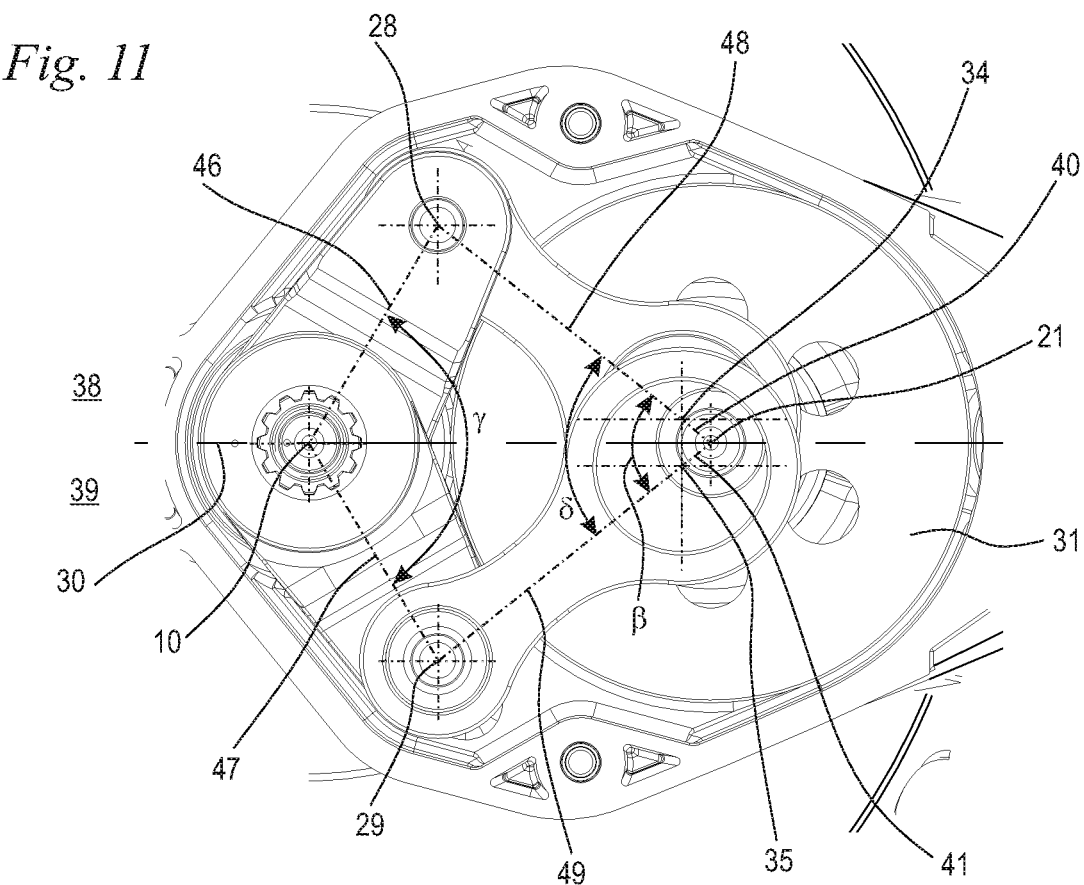
FIG. 11 shows a partial sectional representation of the tool head with the linkages in a first dead center position.

FIG. 11 shows the linkages 42 and 43 in a first end position. In the shown view with direction of view in the direction of the coupling drive axis 21, the imaginary straight connection of the second link axis 28 to the rotational axis 10 forms a first output member axis 46. The imaginary straight connection of the fourth link axis 29 to the rotational axis 10 forms a second output member axis 47. The first output member axis 46 and the second output member axis 47 form an angle γ, which in that setting of the linkages 42 and 43 that is shown in FIG. 11 assumes its maximum value. The angle γ is advantageously greater than 90°.

In the shown view with direction of view in the direction of the coupling drive axis 21, the imaginary straight connection of the second link axis 28 to the first link axis 34 forms a first coupling member axis 48. In this view, the imaginary straight connection of the fourth link axis 29 to the third link axis 35 forms a second coupling member axis 49.

The first drive member axis 40 and the second drive member axis 41 form the angle β. In the dead center position shown in FIG. 11, the drive member axes 40 and 41 lie in straight extension of the coupling member axes 48 and 49. The angle β formed by the drive member axes 40 and 41 is advantageously smaller than 180°, in particular smaller than 140°, preferably smaller than 100°, particularly preferably smaller than 90°. The link axes 34 and 35 lie symmetrically to the center plane 30. The first link axis 34 lies on the first side 38 of the center plane 30, and the third link axis 35 lies on the second side 39 of the center plane 30.

The coupling member axes 48 and 49 form with each other an angle δ. In the dead center positions, the difference between the angle β and the angle δ is preferably very small. In the dead center positions, the angles β and δ are in particular equally large. In the dead center positions, the difference between the angles β and δ advantageously amounts to 0° to 10°.

As a result of a comparatively small, or in particular non-existent, difference between the angle β between the drive member axes 40 and 41 and the angle δ between the coupling member axes 48 and 49 in the dead center positions, an almost synchronous running of the two linkages 42 and 43 is able to be realized. The two linkages 42 and 43 herein not only reach their dead center positions simultaneously, but, in particular, also have between their dead center positions a synchronous speed curve. Very small vibrations are thereby able to be achieved, combined with small installation space of the tool head 51.

Figure 11A:
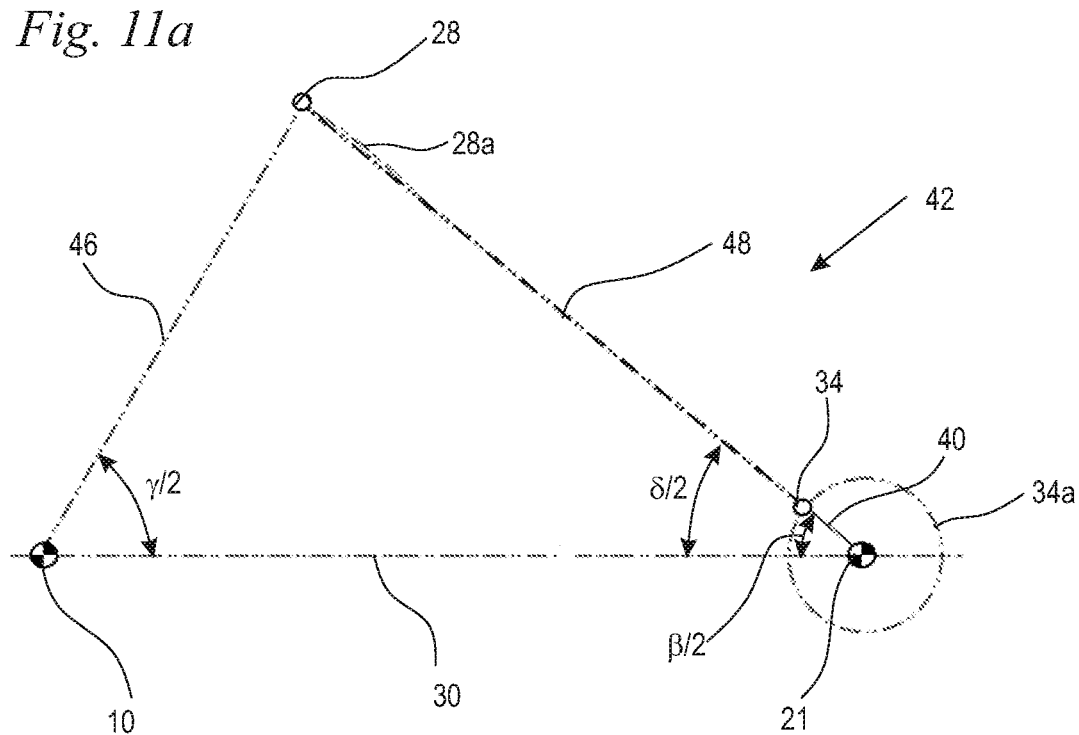
FIG. 11a shows a schematic representation of the first linkage in the first dead center position shown in FIG. 11.

FIG. 11a shows schematically the position of the elements of the first linkage 42 in the first dead center position shown in FIG. 11. The rotational axis 10 and the coupling drive axis 21 are arranged fixedly on the tool head housing 7. The second link axis 28 moves during operation back and forth along the motional path 28a and, in the first dead center position shown in FIG. 11a, is in its outer reversal position. The first link axis 34 revolves around the coupling drive axis 21 along the motional path 34a. The first drive member axis 40 forms with the center plane 30 the half angle β. The first coupling member axis 48 forms with the center plane 30 the half angle δ, which in the illustrative embodiment approximately corresponds to the half angle β. The first output member axis 46 forms with the center plane 30 the half angle γ.

Figure 12:
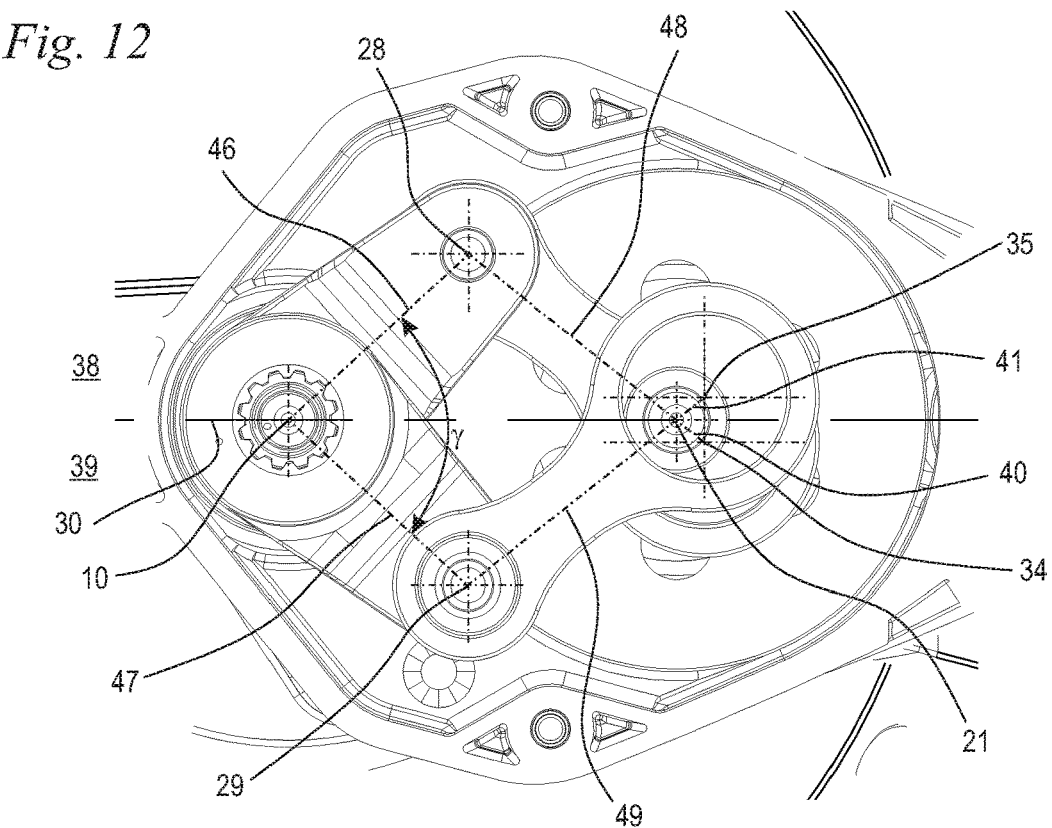
FIG. 12 shows a sectional representation in accordance with FIG. 11 in a second dead center position of the linkages.

FIG. 12 shows the arrangement in a second dead center position, in which the output member axes 46 and 47 form a minimal angle γ. The drive member axes 40 and 41 lie in overlap with the coupling member axes 48 and 49. The drive member axes 40 and 41 form the angle β, which is advantageously equally large as the angle β in the position shown in FIG. 11. The link axes 34 and 35 lie also in the second dead center position symmetrically to the center plane 30.

The first link axis 34 lies on the second side 39 of the center plane 30, and the third link axis 35 lies on the first side 38 of the center plane 30.

Figure 12A:
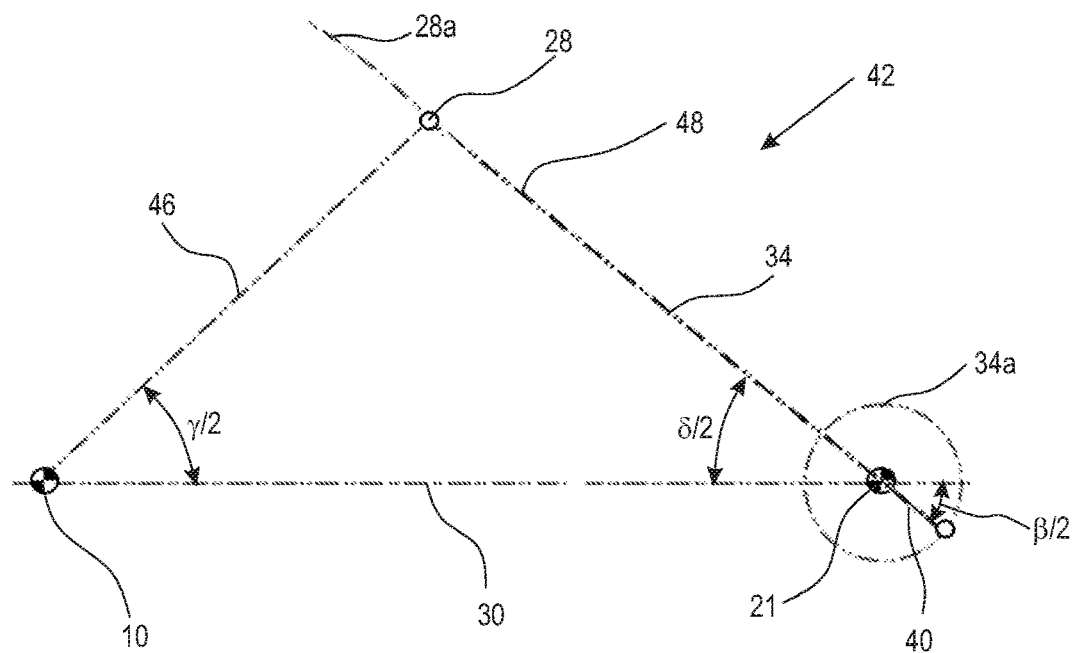
FIG. 12a shows a schematic representation of the first linkage in the second dead center position shown in FIG. 12.

FIG. 12a shows schematically the position of the elements of the first linkage 42 in the second dead center position shown in FIG. 12. In the illustrative embodiment, the second link axis 28 is located on the motional path 28a at its inner reversal point. The first drive member axis 41 forms with the center plane 30 the half angle β. The first coupling member axis 48 forms with the center plane 30 the half angle δ, which in the illustrative embodiment approximately corresponds to the half angle β.

Figure 12B:
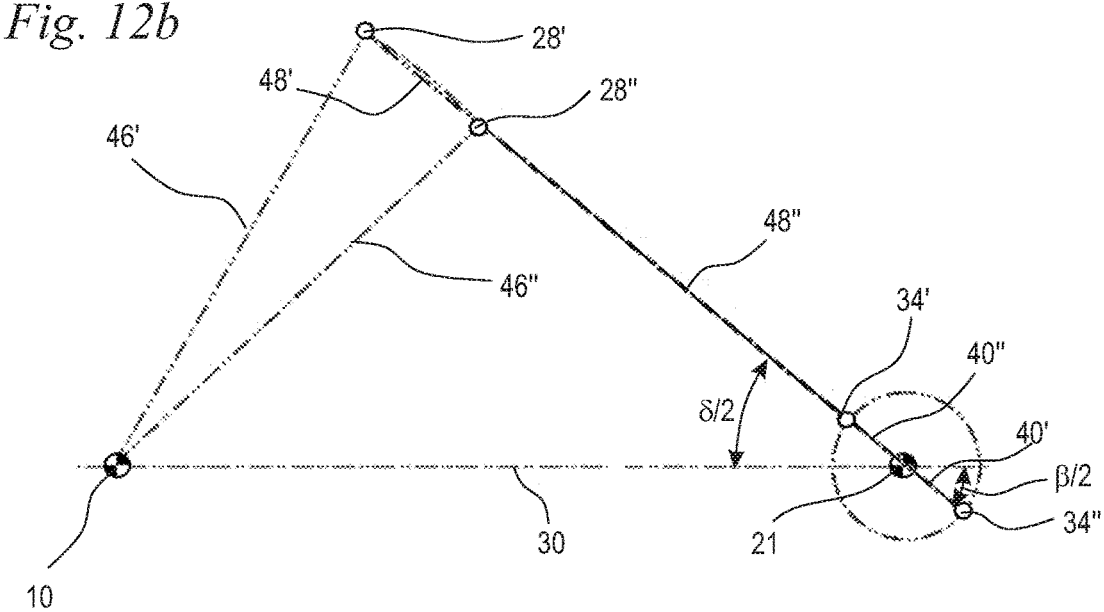
FIG. 12b shows a schematic representation of the first linkage, in which the position of the elements of the linkage for both dead center positions is represented.

FIG. 12b shows schematically the position of the elements of the first linkage 42 in the first and the second dead center position in comparison. In the first dead center position, the respective elements are here marked with one line, and in the second dead center position with two lines. In the illustrative embodiment, the kinematic diagram of the linkage 42, 43 corresponds to a centric crank-and-rocker linkage, according to which—as shown by the figure—the half angles β and δ for both dead center positions are roughly equally large.

Figure 13:
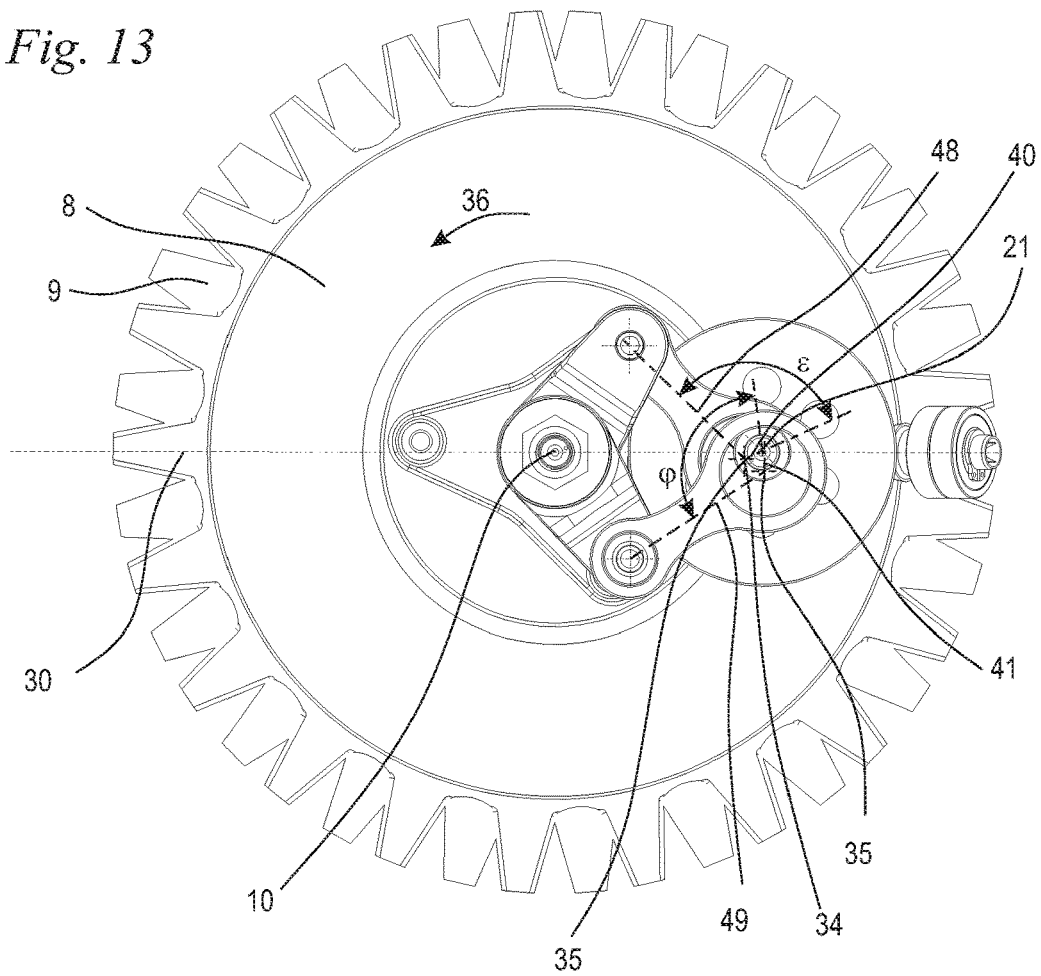
FIG. 13 shows a view of the linkages and of the tools in an intermediate position between the first dead center position and the second dead center position.

FIG. 13 shows the arrangement away from a dead center position. As is shown by FIG. 13, the first drive member axis 40 and the first coupling member axis 48 form a first drive angle ε. The second coupling member axis 49 and the second drive member axis 41 form an angle φ. During operation, the angle ε and the angle φ change due to the rotation of the drive members 40, 41. Since both drive member axes 46, 47 are arranged on a common component, in particular the eccentric component 20, both linkages 42, 43 are driven as one. To the setting of the first linkage 42 is therefore assigned a defined setting of the second linkage 43. The drive member axes 40 and 41 are arranged such that the angle ε and the associated angle φ for each setting of the linkages 42, 43 in relation to one another are at least approximately equally large. The difference between the angles ε and φ advantageously amounts to less than 5°, in particular less than 2°. In return, the angle β corresponds to double the angle which the drive member axis 40, in a dead center position, forms with an axis through the frame-fixed centers of rotation, namely the rotational axis 10 and the coupling drive axis 21 of the linkages 42, 43. In this way, the two linkages 42, 43 run at least approximately synchronously, thus, in particular, not only reach their dead center positions simultaneously, but have also away from the dead center positions an at least approximately equal speed curve. As a result, second-order inertia forces are almost fully compensated.

Figure 13A:
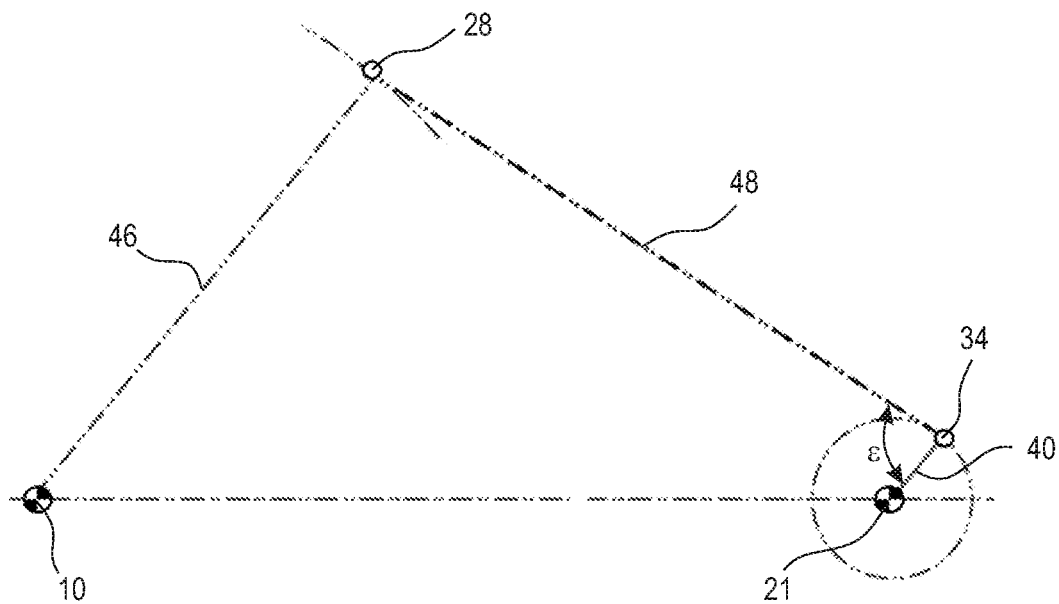
FIG. 13a shows a schematic representation of the first linkage in an intermediate position between the first and the second dead center position.

In FIG. 13a, an intermediate position between the first and the second dead center position for the elements of the first linkage 42 is represented schematically. The first drive angle ε is here clearly discernible.

Figure 14:
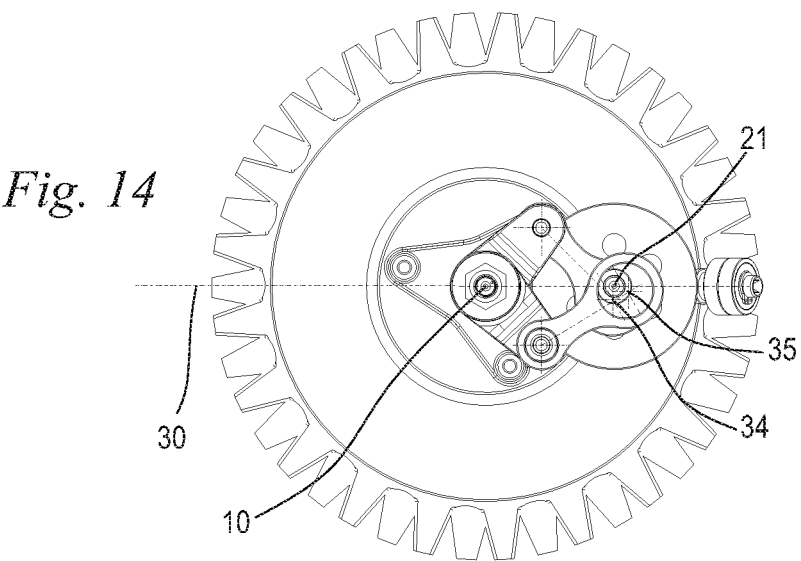
FIG. 14 to FIG. 17 show views of the linkages and of the tools in different positions during a revolution of the eccentric component.
Figure 15:
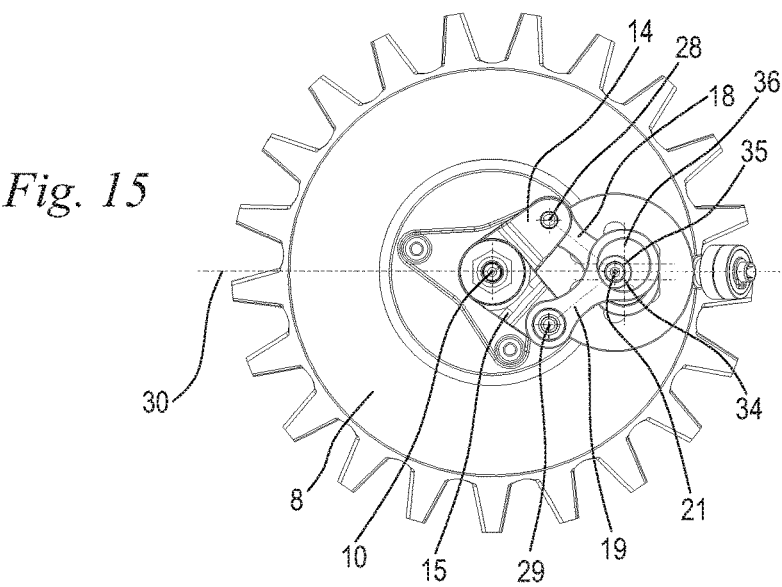
Figure 16:
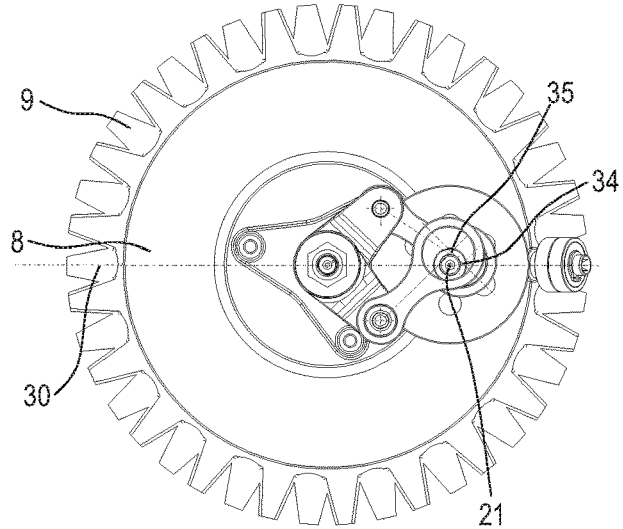
Figure 17:
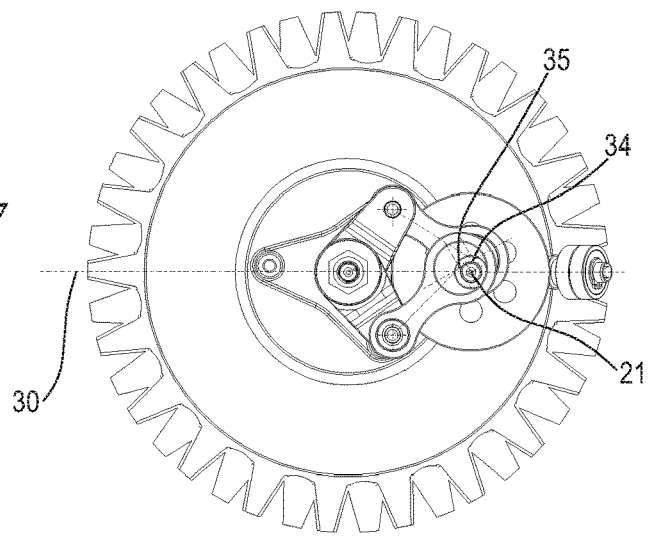
Figure 18:
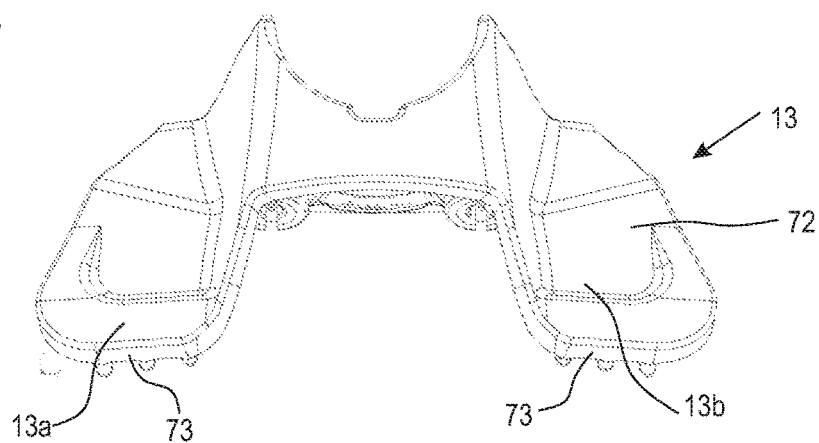
FIG. 18 shows a side view of the stand component of the implement from FIG. 1 in the position in which the stand component is found during working with the implement.

In the representation in FIG. 13, the eccentric component 20 has further rotated through 60°, in relation to the representation in FIG. 11, in the direction of the arrow 36. FIG. 14 shows the arrangement following further rotation through 60° in the direction of the arrow 36. Upon further 60° rotation, the arrangement makes its way into the position shown in FIG. 15, upon further 60° rotation into the position shown in FIG. 16, and upon further 60° rotation into the position shown in FIG. 17. After this, the dead center position shown in FIG. 11 is regained. The position shown in FIG. 15 corresponds to the second dead center position shown in FIG. 12. As is shown by FIGS. 11 to 17, the output members 14 and 15 do not revolve about the rotational axis 10, but pivot back and forth.

While specific embodiments of the invention have been shown and described in detail to illustrate the inventive principles, it will be understood that the invention may be embodied otherwise without departing from such principles.

I claim:

1. A tool head for a hand-guided implement, comprising: a first rotatably mounted tool; a second rotatably mounted tool; a first linkage; and a second linkage, wherein the first tool is drivable via the first linkage and wherein the second tool is drivable via the second linkage, wherein the tools are drivable via the linkages so as to rotate back and forth in opposite directions about a common rotational axis, wherein the first linkage comprises a first drive member and a first coupling member and wherein the second linkage comprises a second drive member and a second coupling member, wherein the first drive member and the second drive member are mounted rotatingly about a common coupling drive axis, wherein the first drive member is coupled to the first coupling member pivotably about a first link axis, and wherein the first coupling member is coupled to the first tool pivotably about a second link axis, wherein the second drive member is coupled to the second coupling member pivotably about a third link axis, and wherein the second coupling member is coupled to the second tool pivotably about a fourth link axis, wherein the first drive member has a first drive member axis that connects the coupling drive axis to the first link axis, and wherein the second drive member has a second drive member axis that connects the coupling drive axis to the third link axis, wherein an angle between the first drive member axis and the second drive member axis is greater than 0°, and wherein the rotational axis of the tools and the coupling drive axis span a center plane, wherein the center plane runs between the second link axis and the fourth link axis.

2. The tool head according to claim 1, wherein the angle between the first drive member axis and the second drive member axis is smaller than 180°.

3. The tool head according to claim 1, wherein the first coupling member has a first coupling member axis that connects the first link axis to the second link axis, and the second coupling member has a second coupling member axis that connects the third link axis to the fourth link axis, wherein the two linkages are arranged so that a first drive angle between the first drive member axis and the first coupling member axis, and a second drive angle between the second drive member axis and the second coupling member axis, is equal for each setting of the linkages.

4. The tool head according to claim 1, further comprising a transmission including a drive pinion and a ring gear, wherein the ring gear is connected in a rotationally secure manner to the drive members of the linkages.

5. The tool head according to claim 4, wherein the ring gear has a radius at least 3.5 times a distance of the first link axis from the coupling drive axis.

6. The tool head according to claim 4, wherein at least one portion of the ring gear is arranged between the drive members and the tools.

7. The tool head according to claim 4, wherein the drive pinion meshes with the ring gear, and the drive pinion has a connecting contour for a rotationally secure connection to a drive shaft of an implement.

8. The tool head according to claim 1, further comprising an output member that couples at least one of the coupling members to an assigned one of the tools, wherein the output member is connected in a rotationally secure manner to the assigned tool.

9. The tool head according to claim 8, wherein the output member is pivotable through less than 360° about the rotational axis.

10. The tool head according to claim 1, wherein the first tool is fixed to a sleeve and the second tool is fixed to a shaft which projects through the sleeve.

11. The tool head according to claim 1, wherein at least one of the tools has at least one cutting edge, which, upon each movement in one direction, brushes over two counter edges of the other of the tools.

12. An implement, comprising: a drive motor having a drive shaft; and a tool head including a drive pinion, a first rotatably mounted tool, a second rotatably mounted tool, a first linkage and a second linkage, wherein the first tool is drivable via the first linkage and the second tool is drivable via the second linkage, wherein the tools are drivable via the linkages so as to rotate back and forth in opposite directions about a common rotational axis, wherein the first linkage comprises a first drive member and a first coupling member and wherein the second linkage comprises a second drive member and a second coupling member, wherein the first drive member and the second drive member are mounted rotatingly about a common coupling drive axis, wherein the first drive member is coupled to the first coupling member pivotably about a first link axis, and wherein the first coupling member is coupled to the first tool pivotably about a second link axis, wherein the second drive member is coupled to the second coupling member pivotably about a third link axis, and wherein the second coupling member is coupled to the second tool pivotably about a fourth link axis, wherein the first drive member has a first drive member axis that connects the coupling drive axis to the first link axis, and wherein the second drive member has a second drive member axis that connects the coupling drive axis to the third link axis, wherein an angle between the first drive member axis and the second drive member axis is greater than 0°, and wherein the rotational axis of the tools and the coupling drive axis span a center plane, wherein the center plane runs between the second link axis and the fourth link axis, wherein the drive shaft is connected in a rotationally secure manner to the drive pinion of the tool head.

13. The implement according to claim 12, wherein the drive pinion, during operation, is drivable at a rotation speed of at least 5,000 revolutions per minute.

14. The implement according to claim 13, wherein the drive motor has a motor output shaft, wherein the motor output shaft has a rotation speed equal to the rotation speed of the drive pinion.

15. A tool head for a hand-guided implement, comprising: at least one rotatably mounted tool, wherein the at least one tool is drivable so as to rotate back and forth about a rotational axis, wherein the tool has a cutting plane; and a stand component that has a peripheral wall that projects through the cutting plane, wherein the tool head has a socket configured to accept a guide tube, wherein the stand component is arranged on a side of the socket that, during operation, faces ground, wherein the peripheral wall is bounded in a peripheral direction by a first end face and a second end face, wherein the end faces, in the cutting plane, form an angle of less than 60° about the rotational axis, and wherein the peripheral wall between the first end face and the second end face has at least one recess that extends into the cutting plane and separates two portions of the peripheral wall from one another.

* * * * *